United States Patent [19]

Wood

[11] 4,052,026
[45] Oct. 4, 1977

[54] LOAD SUSPENSION EQUALIZING THIMBLE

[75] Inventor: Roger D. Wood, Harrisburg, S. Dak.

[73] Assignee: Raven Industries, Inc., Sioux Falls, S. Dak.

[21] Appl. No.: 689,254

[22] Filed: May 24, 1976

[51] Int. Cl.² .............................................. B64B 1/22
[52] U.S. Cl. ..................................... 244/127; 244/30
[58] Field of Search ................... 244/30, 31, 127, 96, 244/97, 98

[56] References Cited

U.S. PATENT DOCUMENTS 1,372,924  3/1921  Andersson ........................... 244/127

FOREIGN PATENT DOCUMENTS 476,700  8/1915  France ................................. 244/127
154,457  12/1920  United Kingdom .................. 244/97

Primary Examiner—Trygve M. Blix
Assistant Examiner—Barry L. Kelmachter
Attorney, Agent, or Firm—Hill, Gross, Simpson, Van Santen, Steadman, Chiara & Simpson

[57] ABSTRACT

A hot air airship including an elongate aerodynamic shaped gas envelope carrying a hot air pressure generating device to pressurize the envelope with heated air, tail members at the aft end and a gondola below the envelope and including a load equalizing suspension system for the gondola with a plurality of suspension cables secured within the gas envelope at distributed fore and aft points at each side thereof and decreasing to a fewer number of cables with each cable finally looped beneath the envelope and having a thimble slidable thereon to equally distribute the load to each side of the envelope and the thimble having a securing portion for attaching it to the gondola with a propeller mounted on the gondola.

9 Claims, 5 Drawing Figures

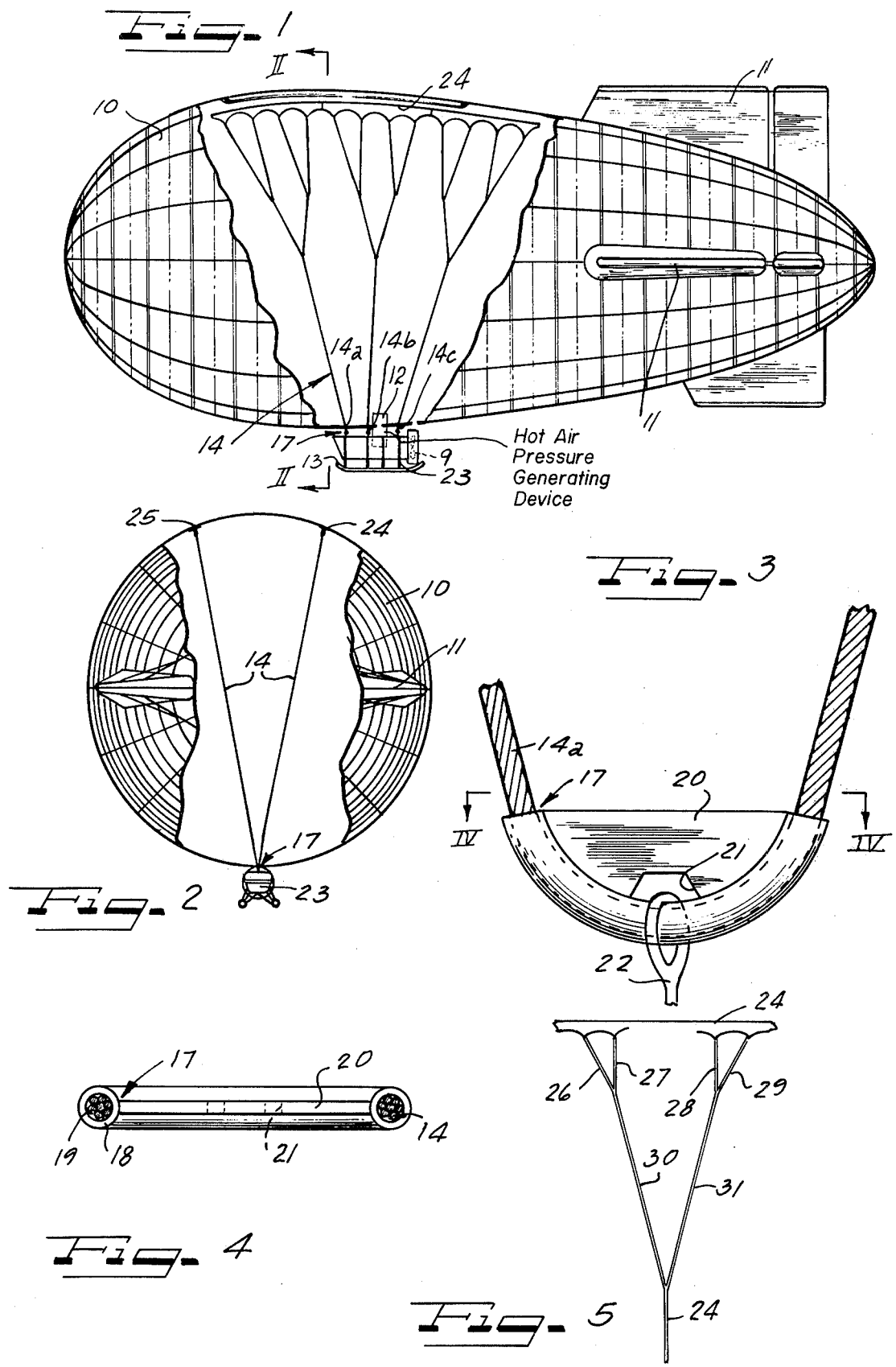

LOAD SUSPENSION EQUALIZING THIMBLE

BACKGROUND OF THE INVENTION

The present invention relates to improvements in vehicles for traveling through the atmosphere and transporting a payload, and more particularly to a powered hot air airship and to a load equalizing suspension means therefor.

Airships of this type have been referred to as dirigibles and originally referred to as blimps when the airship is nonrigid. The present invention in particular relates to a hot air inflated airship of the nonrigid pressure type. The main envelope or pressure hull is formed of a fabric such as a laminated plastic and nylon, or of suitable other material which is lightweight, extremely strong and resistant to gas diffusion. The envelope of the airship is horizontally elongate and is primarily symmetrical with load lines distributed over the body of the envelope for carrying a payload therebelow. The load lines are also particularly arranged to support hot gas pressure inflation means which preferably will be in the form of one or more propane fueled burners with a fan inflation means. The fan or blower which pressurizes the airship is driven by a suitable motor which may be propane or gasoline fueled.

The plastic fabric envelope when not in use can be folded and shipped or stored in the space which takes up less than 1% of its inflated volume. The envelope can be relatively rapidly inflated by the operation of the fan and the free lift is controllable by control of the burner which controls the temperature of the air within the envelope. The direction of flight is controlled by tail fins at the aft end of the airship envelope.

Supported beneath the inflated airship envelope is a gondola which carries a payload and equipment. Passengers, a pilot, and other payloads such as freight or mail are supported in the gondola. Also, suspended beneath the airship, preferably on the gondola, is the propelling means which will be a gasoline or propane fueled engine with a driving propeller. The gondola and its load are supported entirely by the free lift of the gas in the airship envelope, and therefore, it is necessary to provide means for suspending the gondola below the envelope in such a manner that the load is equally distributed along the fabric of the envelope. The airship envelope is of an extremely tough lightweight material. This material contains the hot air and provides adequate free lift, but it is essential that the load therebeneath be distributed relatively uniformly over the surface of the envelope so as to not cause excessive stresses at any one location. The hull or the envelope, for example, may be on the order of 120 feet long and 40 feet in diameter in one airship which has been constructed which is capable of carrying a gross load of 2200 pounds.

It is an object of the invention to provide an improved suspension equalizing system wherein the weight of the gondola and other equipment below the airship envelope is equally distributed to both sides of the envelope and over a substantial area of airship envelope.

A further object of the invention is to provide a hot air pressurized airship with cables extending down on both sides of the airship envelope and an improved load equalizing suspension means below the envelope for distributing the load equally to both sides of the envelope without the necessity of having to provide complicated and bulky equipment such as use springs, load absorbers and the like which are costly and add unnecessary weight.

A further object of the invention is to provide a load suspension system which is light in weight and has strength and can accommodate different loads and deflection or distortion of the airship envelope shape.

For example, the invention contemplates a plurality of cables with each cable looped downwardly from one side of the airship envelope to the other and with the cables arranged in groups, and each group slidably passing through a thimble which connects to the gondola. The thimble equally distributes the payload of the gondola to each side of the airship envelope, and the cables equally distribute the load in a fore and aft direction.

Other objects, features and advantages of the invention, as well as equivalent embodiments thereof which are intended to be covered herein, will become more clear with the teaching of the principles of the invention in connection with the disclosure of the preferred embodiments in the specification, claims and drawings in which:

DRAWINGS

FIG. 1 is an elevational view of an airship envelope, having portions broken away for clarity of illustration, embodying the principles of the present invention;

FIG. 2 is an elevational view with a portion in section taken generally along line II—II of FIG. 1;

FIG. 3 is an enlarged detailed fragmentary view illustrating the sliding thimble at the base of the looped cable;

FIG. 4 is a detailed sectional view taken substantially along line III—III of FIG. 3; and FIG. 5 is a fragmentary somewhat schematic view illustrating the general arrangement of cables along each side of the airship envelope.

DESCRIPTION

As illustrated in FIG. 1, the airship is formed by horizontally elongate airship envelope 10. The envelope is formed of a lightweight plastic material, preferably with nylon or dacron heat resistant threads embedded therein, and the material may be conveniently formed in gores which are sewn or adhered to each by heat sealing along their seams. The envelope is aerodynamic shaped for horizontal travel through the air and for take-off and landing. At the base of the envelope is an opening in which is mounted a hot air inflator and generator 12. This will be preferably in the form of a propane burner which is thermostatically controlled with the thermostat within the balloon interior. The capacity of the burners will be predetermined and will be set for a given payload so that the air within the airship will be heated for adequate free lift. The inflating propeller will run continuously, and may be shut off at the termination of flight after the airship has landed to permit the airship envelope to collapse for storage.

The tail of the airship envelope is provided with vertical and horizontal fins 11 which have a fixed portion and a movable portion. The movable portions are controlled by cable controls, not shown, which extend down to be operated by an operator or pilot in the gondola 13 who manipulates the vertical and horizontal surfaces to direct the course of the flight of the airship and cause it to ascend or descend.

The gondola carries the passengers and payload and will support an engine and propeller 9 for moving the airship forward during horizontal flight. The propeller and engine are not shown in detail, but are indicated generally at 23 on the gondola 13.

For suspending the gondola beneath the airship envelope, a plurality of cables are provided looped downwardly so that they extend up on each side of the envelope. These sets of cables are spaced apart in a fore and aft direction, and preferably extend within the envelope although in some forms they may be secured to the outer surface of the skin of the envelope.

Each of the cables 14, as shown in FIGS. 1, 2 and 5 extends downwardly from one side of the airship, passes through the thimble and extends upwardly on the other side of the airship. The cables are divided so as to be evenly spaced at their upper ends and their lower ends in FIG. 1. The arrangement is shown as having three cables, with the cables also shown in FIG. 5. The upper ends of the cables are firmly secured to the airship envelope such as by a heavy plastic or fabric strip 24 cemented or sewn to the envelope material at its top edge with the upper ends of the cables sewn, adhered or heat sealed to the fabric. One strip of fabric 24 extends axially along one side of the airship, and another strip 25 extends axially along the other side. Thus, one end of the looped cables is secured in one of the cable attachments 24, and the other end is secured in the other cable attachment 25. This transfers the load of the gondola evenly to points evenly spaced from the center of the airship near the upper surface thereof. The heated air or gases within the airship provide free lift on the airship envelope which is transferred through the cables to support the gondola below the airship, and a stable assembly will be provided. The cables at their lower end will pass through a reinforced opening in the airship envelope slightly larger than that required by the cables so that as the load equalizes by a thimble 17 sliding on the cable, the cables can shift laterally as needed. This arrangement transfers the load of the gondola equally to both sides of the airship, and transfers or distributes the load longitudinally over a substantial area of the airship envelope.

The lower looped end of the cables 14 pass through a fitting or thimble 17 which is slidable on the cable cluster so that the downward load on the thimble is equally assumed by both sides of the cables extending upwardly. The thimble is made in the form of a curved tube which is given the curvature of the cable at normal envelope inflation, and this may be considered to be the catenary curvature. The tube of the thimble has extending thereacross a plate 20 which is curved and secured at its outer edge to the tube such as by welding, and has an opening 21 through which a lower connector 22 is looped which connects directly to the gondola. The connector 22 may be in the form of a hook or releasable loop for attachment and reattachment of the gondola.

Thus, with looped cables 14 divided or branched and divided again, there are four support points for each end of the cable transferring the load of three looped cables to twenty-four locations on the hull envelope. These divided ends are constructed to be of a length so that each of the cable ends receives substantially the same total load. This load will be divided and each side of the airship envelope will receive an equal load, and this load will be uniformly distributed in a fore and aft direction along the envelope wall. The cables may be formed of nylon or dacron, or if desired, may be steel. The support from 24 locations along the hull envelope thus provides three support locations for the gondola, shown at 14a, 14b and 14c in FIG. 1.

If desired, the connector may be provided with a length adjustment means so that an equal load is placed on each of the thimbles. The thimbles will slide along the cable to automatically cause equal distribution to the two sides of the cable. This arrangement is used for support of the gondola, but it may be used for support of other members below the envelope.

FIG. 5 shows the preferred arrangement for connection of the cables within the airship envelope. A cable assembly is provided with the upper ends of the cable lengths 26, 27, 28 and 29 connected to the webbing 24 at the top of the airship. These cable lengths will be joined in a Y-shape so that lengths 26 and 27 connect to a single cable 30, and lengths 28 and 29 connect to a single cable 31. The cables 30 and 31 join in a Y to a single cable 32 which is looped downwardly to pass through a thimble. The cable 24 extends upwardly at the other side of the airship to another assembly similar to that shown which is connected to the webbing 25 at the top of the airship spaced laterally from the webbing 24.

In some instances it may be desirable to provide a more simple assembly wherein the upper ends of the cables are not divided. In such arrangement each cable will be comprised of a single looped strand of line with the ends of the lines connected directly to webbing such as 24 and 25 at the top of the airship. This arrangement will not distribute the load as uniformly along the top of the airship, but will provide a more simplified cable construction.

The thimbles 17 are simple in construction and operate to immediately and easily assume the position of equal load on each of the cables without creating wear. The structures are inexpensive in manufacture and readily and easily assembled during assembly of the airship. Thus, a structure has been provided which meets the objectives and advantages above set forth and which is capable of adaptation to airship structures of various size and load capabilities.

I claim as my invention:

1. A thermal hot air airship comprising in combination:

an elongate aerodynamic shaped hot air retaining envelope of a flexible material;

hot air pressure generating means carried on the envelope for pressurizing the envelope with heated air for supplying substantially the entire lift force during flight;

tail members at the aft end of the envelope;

a gondola carried beneath the envelope;

a power operated propeller means on the gondola for driving the airship in horizontal flight;

a plurality of suspension cables each cable having ends secured to the gas envelope on each side adjacent the top of the envelope, the suspension cables being spaced from each other from the fore to the aft end of the airship and each cable being looped laterally in free hanging fashion downwardly beneath the envelope;

a thimble means on each of the cables beneath the envelope for sliding on each cable at the bottom thereof for equally distributing the vertical load through the suspension cables to each side of the envelope;

and means securing the gondola to the thimble means to be suspended therebeneath.

2. A thermal airship constructed in accordance with claim 1:
wherein each thimble means is a hollow shaped curved cylinder having a curvature substantially the same as the suspension curvature of the cables.

3. A thermal airship constructed in accordance with claim 1:
wherein each suspension cable extends upwardly on the side of the gas envelope and divides to an increasing number of cables with each of said increasing number secured to the airship envelope.

4. A thermal airship constructed in accordance with claim 1:
wherein the upper ends of each of the suspension cables are secured to the envelope by a reinforcing patch of material secured to the envelope.

5. A thermal airship constructed in accordance with claim 1:
wherein the cables extend within the envelope.

6. A thermal airship constructed in accordance with claim 1:
wherein the spacing of the suspension cables in a fore and aft direction is substantially uniform.

7. A thermal airship constructed in accordance with claim 1:
wherein the upper ends of the cables are connected to the airship envelope at one side thereof by a unit section of flexible material.

8. A thermal airship comprising in combination:
an elongate aerodynamic shaped gas envelope of a flexible material;
hot air pressure generating means carried on the envelope for pressurizing the envelope with heated air during flight;
tail members at the aft end of the envelope;
a gondola carried beneath the envelope;
a power operated propeller means on the gondola for driving the airship in horizontal flight;
a plurality of suspension cables, each cable having ends secured to the gas envelope on each side, the suspension cables being spaced from each other from the fore to the aft end of the airship and each cable being looped laterally downwardly beneath the envelope;
a thimble means on each of the cables beneath the envelope slidable thereon for equally distributing the vertical load through the suspension cables to each side of the envelope;
means securing the gondola to the thimble means to be suspended therebeneath; and
each of the thimble means being a hollow curved tube with an interconnecting plate means extending across the ends of the tube reinforcing the curvature thereof.

9. A thermal airship constructed in accordance with claim 8:
wherein said means securing the gondola to the thimble means passes through an opening in said plate means.

* * * * *